(12) United States Patent
Pal et al.

(10) Patent No.: US 12,584,746 B2
(45) Date of Patent: Mar. 24, 2026

(54) METHOD AND SYSTEM OF EVALUATION OF SOURCE MAP SUFFICIENCY FOR VEHICLE MAP INTEGRATION

(71) Applicant: HONEYWELL INTERNATIONAL INC., Charlotte, NC (US)

(72) Inventors: Debabrata Pal, Kolkata (IN); Anvita Singh, Hyderabad (IN); Abhishek Alladi, Hyderabad (IN); Srinivasa Rao Pilla, Hyderabad (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/910,176

(22) Filed: Oct. 9, 2024

(65) Prior Publication Data

US 2026/0056017 A1 Feb. 26, 2026

(30) Foreign Application Priority Data

Aug. 23, 2024 (IN) .............................. 202411063707

(51) Int. Cl.
  *G06V 10/80* (2022.01)
  *G01C 21/00* (2006.01)
  (Continued)

(52) U.S. Cl.
  CPC ....... *G01C 21/005* (2013.01); *G01C 21/3841* (2020.08); *G06V 10/16* (2022.01);
  (Continued)

(58) Field of Classification Search
  CPC .......................... G01C 21/005; G01C 21/3841
  See application file for complete search history.

(56) References Cited

U.S. PATENT DOCUMENTS 8,786,632 B2  7/2014 Miwa
9,710,882 B2 *  7/2017 Kjeldergaard ........... G09G 5/14
  (Continued)

FOREIGN PATENT DOCUMENTS

CN  113284407 A  8/2021
CN  114910064 A  8/2022
  (Continued)

OTHER PUBLICATIONS

Conrad Power, Alvin Simms & Roger White (2001) Hierarchical fuzzy pattern matching for the regional comparison of land use maps, International Journal of Geographical Information Science, 15:1, 77-100, DOI: 10.1080/136588100750058715.
  (Continued)

*Primary Examiner* — Jonathan M Dager
(74) *Attorney, Agent, or Firm* — Ingrassia Fisher & Lorenz LLP

(57) ABSTRACT

A method includes receiving map image data of multiple horizontal input maps of an overlapping geographical area and arranged to be displayed on a display device on a vehicle. Each input map has style data and at least one layer associated with a different type of geographical data shown on the map. The method includes generating multiple plain maps comprising removing the style data from the map image data of each input map, and determining common layers between at least two of the plain maps showing the same type of geographical data. The method includes determining data of a discrepancy map of discrepancies between the common layers of the at least two plain maps and for each common layer of the at least two plain maps, and generating an error value of the at least two plain maps comprising using the discrepancy maps.

20 Claims, 7 Drawing Sheets

(51) Int. Cl.
| | |
|---|---|
| *G06V 10/10* | (2022.01) |
| *G06V 10/75* | (2022.01) |
| *G06V 10/82* | (2022.01) |

(52) U.S. Cl.
CPC ............ *G06V 10/751* (2022.01); *G06V 10/80* (2022.01); *G06V 10/82* (2022.01)

(56) References Cited

U.S. PATENT DOCUMENTS

| | | | | |
|---|---|---|---|---|
| 9,804,751 | B2* | 10/2017 | Petrucci | ................... G06T 7/30 |
| 10,002,156 | B2* | 6/2018 | Lublinsky | ......... G01C 21/3667 |
| 10,408,628 | B2* | 9/2019 | Stess | ....................... G06F 18/22 |
| 10,431,122 | B2 | 10/2019 | Harrower et al. | |
| 11,810,225 | B2* | 11/2023 | Bagschik | .............. G06N 3/094 |
| 11,838,836 | B2* | 12/2023 | McGavran | ................ G06F 8/65 |
| 11,933,629 | B2* | 3/2024 | Igarashi | ............ G01C 21/3889 |
| 12,299,789 | B2* | 5/2025 | Xu | ....................... G06V 10/803 |
| 2010/0017733 | A1* | 1/2010 | Barros | ................. G06F 3/0482 |
| | | | | 715/810 |
| 2010/0042315 | A1* | 2/2010 | Ikeuchi | ............. G01C 21/3878 |
| | | | | 701/532 |
| 2010/0321399 | A1* | 12/2010 | Ellren | ..................... G06F 16/29 |
| | | | | 345/522 |
| 2011/0279652 | A1* | 11/2011 | Eggert | ................... G06T 7/593 |
| | | | | 348/47 |
| 2014/0058661 | A1* | 2/2014 | Choi | ................... G09B 29/106 |
| | | | | 701/428 |
| 2014/0119674 | A1* | 5/2014 | Das | ..................... G01C 21/206 |
| | | | | 382/284 |
| 2014/0164415 | A1* | 6/2014 | Duleba | ................... G06F 16/29 |
| | | | | 707/758 |
| 2015/0188977 | A1* | 7/2015 | Berry | ................... G06T 7/0002 |
| | | | | 709/217 |
| 2018/0089791 | A1* | 3/2018 | Greenwood | ........... H04L 67/10 |
| 2018/0188043 | A1* | 7/2018 | Chen | ....................... G06T 17/20 |
| 2019/0143967 | A1* | 5/2019 | Kutila | .............. B60W 60/0016 |
| | | | | 701/23 |
| 2019/0220003 | A1 | 7/2019 | Sharma et al. | |
| 2020/0394838 | A1* | 12/2020 | Bulan | ..................... G06T 17/05 |
| 2021/0341940 | A1* | 11/2021 | Baik | ................. G01C 21/3896 |
| 2021/0406559 | A1* | 12/2021 | Efland | .............. G06V 10/803 |
| 2022/0148440 | A1* | 5/2022 | Graham | .............. G06F 3/04842 |
| 2022/0205783 | A1* | 6/2022 | Chen | ..................... G06V 20/58 |

FOREIGN PATENT DOCUMENTS

| | | |
|---|---|---|
| CN | 117891961 A | 4/2024 |
| CN | 112487999 B | 6/2024 |
| EP | 3708958 A1 | 9/2020 |
| JP | 2020034930 A | 3/2020 |
| KR | 102129408 B1 | 7/2020 |

OTHER PUBLICATIONS

Maria-Jesús Lobo, Emmanuel Pietriga, Caroline Appert. An Evaluation of Interactive Map Comparison Techniques. CHI 2015—Proceedings of the 33rd Annual ACM Conference on Human Factors in Computing Systems, ACM, Apr. 2015, Seoul, South Korea. pp.3573-3582, 10.1145/2702123.2702130. hal-01144163.

* cited by examiner

FIG. 2

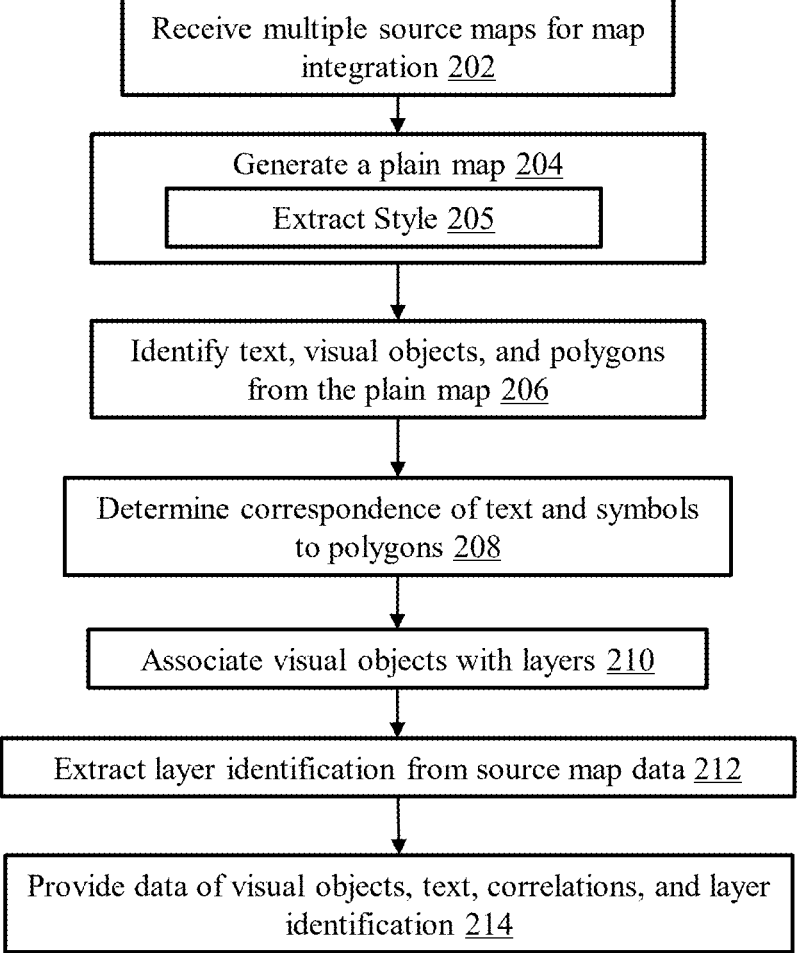

200

Receive multiple source maps for map
integration 202

Generate a plain map 204

Extract Style 205

Identify text, visual objects, and polygons
from the plain map 206

Determine correspondence of text and symbols
to polygons 208

Associate visual objects with layers 210

Extract layer identification from source map data 212

Provide data of visual objects, text, correlations, and layer
identification 214

FIG. 5    500

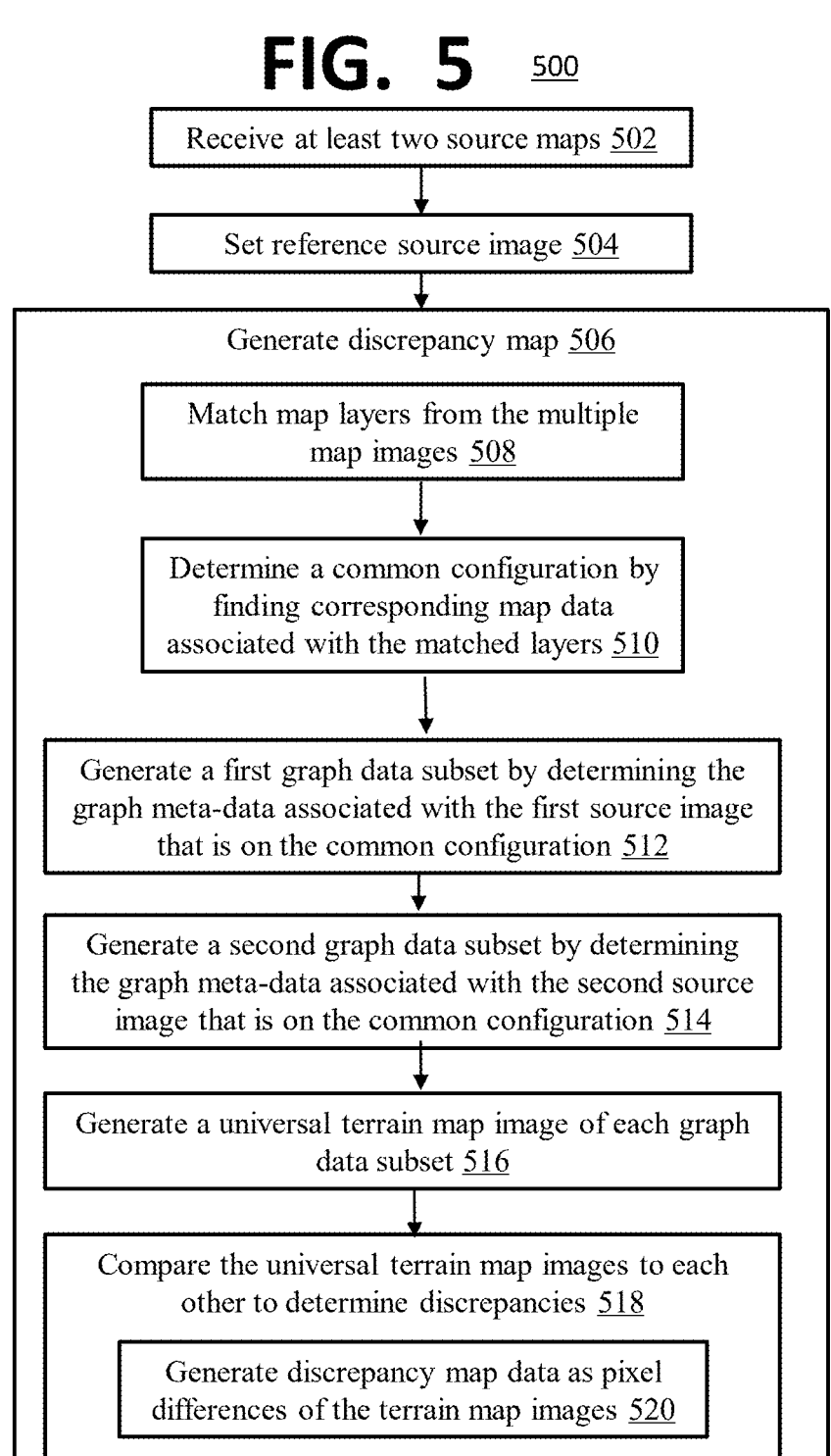

Receive at least two source maps 502

Set reference source image 504

Generate discrepancy map 506

Match map layers from the multiple map images 508

Determine a common configuration by finding corresponding map data associated with the matched layers 510

Generate a first graph data subset by determining the graph meta-data associated with the first source image that is on the common configuration 512

Generate a second graph data subset by determining the graph meta-data associated with the second source image that is on the common configuration 514

Generate a universal terrain map image of each graph data subset 516

Compare the universal terrain map images to each other to determine discrepancies 518

Generate discrepancy map data as pixel differences of the terrain map images 520

Figure 7:
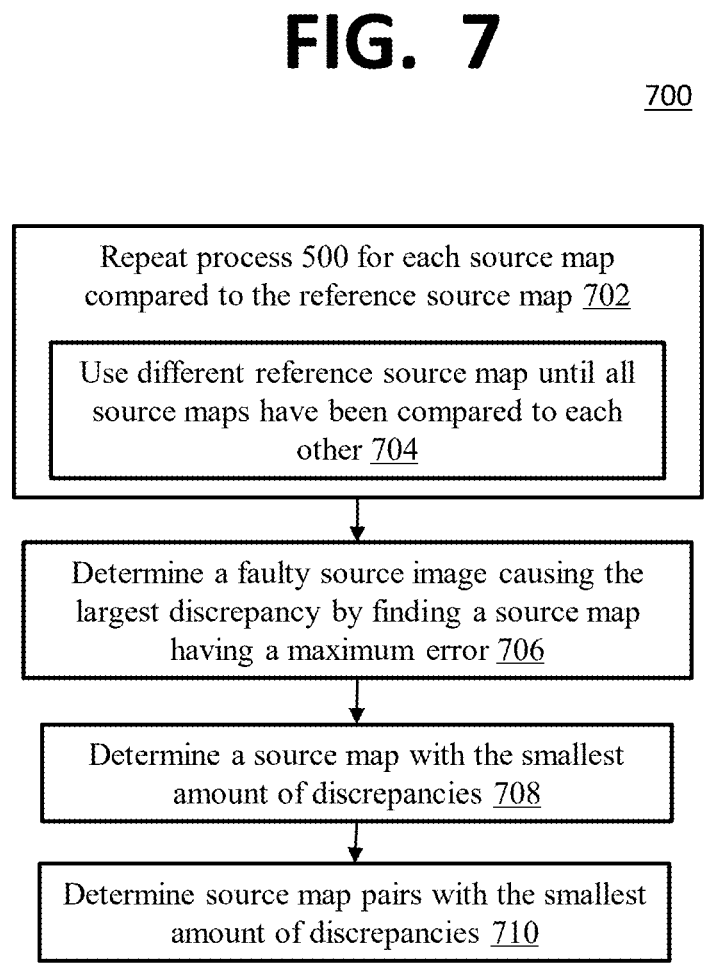

Repeat process 500 for each source map compared to the reference source map 702

Use different reference source map until all source maps have been compared to each other 704

Determine a faulty source image causing the largest discrepancy by finding a source map having a maximum error 706

Determine a source map with the smallest amount of discrepancies 708

Determine source map pairs with the smallest amount of discrepancies 710

METHOD AND SYSTEM OF EVALUATION OF SOURCE MAP SUFFICIENCY FOR VEHICLE MAP INTEGRATION

CROSS REFERENCE TO RELATED APPLICATION

This application claims priority to India Provisional Patent Application No. 202411063707, filed Aug. 23, 2024, the entire content of which is incorporated by reference herein.

TECHNICAL FIELD

The subject matter described herein relates generally to displays on vehicles, and more particularly to validation of horizontal source map integration for vehicle displays.

BACKGROUND

Aircraft displays in a cockpit provide situational awareness to pilots for safe and efficient navigation and control of the aircraft. This can include several different horizontal or lateral displays that each may provide different information for the pilot, such as airspace displays, traffic displays, terrain displays, other navigational aids, and so forth. In order to reduce pilot workload and increase efficiency, the horizontal displays (or maps) are combined into a single integrated map so that the pilot does not need to look at multiple different displays around a cockpit. The source maps being combined may originate from different source providers or may be of different types of horizontal maps from the same provider. In either case, however, it has been found that the integration of multiple different maps into a single map is complicated and can result in mismatches that display incorrect information on the integrated map that might be relied upon by the pilot. Hence, it is desirable to provide systems and methods that analyze horizontal map integration to determine which map sources should be used for the map integration before being used on an aircraft and/or warn pilots when a mismatch on an integrated map is detected on the aircraft.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one example implementation, a method includes receiving map image data of multiple input maps of an overlapping geographical area and arranged to be displayed on a display device on a vehicle. Each input map has style data and at least one layer each associated with a different type of geographical data shown on the map. The method includes generating, by at least one processor, multiple plain maps including removing the style data from the map image data of each input map. The method includes determining, by at least one processor, common layers between at least two of the plain maps showing the same type of geographical data, and determining, by at least one processor, data of a discrepancy map of discrepancies between the common layers of at least two of the plain maps and for each common layer of the at least two plain maps. The method includes generating, by at least one processor, an error value of the at least two plain maps including using the discrepancy maps.

In another example implementation, a system includes a display arranged to show horizontal input maps, memory to store data related to visual objects shown on the horizontal input maps to be displayed on the display, processor circuitry forming at least one processor communicatively coupled to the memory. The at least one processor is arranged to operate by: receiving map image data of multiple horizontal input maps of an overlapping geographical area and arranged to be displayed on a display device on a vehicle. Each map has style data and at least one layer associated with a type of geographical data shown on the map. The type of geographical data provides one or more visual objects each having a geographical location and indicating information on the layer. The processor is arranged to operate by generating multiple plain maps comprising removing the style data from the map image data of each input map. The processor also determines common layers between at least two of the plain maps showing the same type of geographical data, and determines discrepancies between compared visual objects originally from different plan maps of common layers. The compared visual objects are provided from the plain maps to indicate the same or overlapping geographical location and at least some of the same information. The processor also generates data of a discrepancy map of the discrepancies.

In yet another example implementations, a non-transitory computer-readable medium has computer-executable instructions stored thereon that, when executed by a computing device, cause the computing device to operate by: receiving map image data of multiple input maps of an overlapping geographical area and arranged to be displayed on a display device on a vehicle. Each input map has style data and at least one layer each associated with a different type of geographical data shown on the map. The computing device also generates, by at least one processor, multiple plain maps comprising removing the style data from the map image data of each input map. The computing device also determines by at least one processor, common layers between at least two of the plain maps showing the same type of geographical data. The computing device also determines by at least one processor, data of a discrepancy map of discrepancies between the common layers of the at least two plain maps and for each common layer of the at least two plain maps, and generates, by at least one processor, an error value of the at least two plain maps comprising using the discrepancy maps.

Furthermore, other desirable features and characteristics of the system and method for pilot augmentation of transcribed audio messages as described herein will become apparent from the subsequent detailed description and the appended claims, taken in conjunction with the accompanying drawings and the preceding background.

BRIEF DESCRIPTION OF THE DRAWINGS

Implementations of the subject matter will hereinafter be described in conjunction with the following drawing figures, wherein like numerals denote like elements, and:

FIG. 2 is a flow chart of an example process of obtaining relevant map data from map sources to be combined according to at least one of the implementations herein;

3

Figure 4:
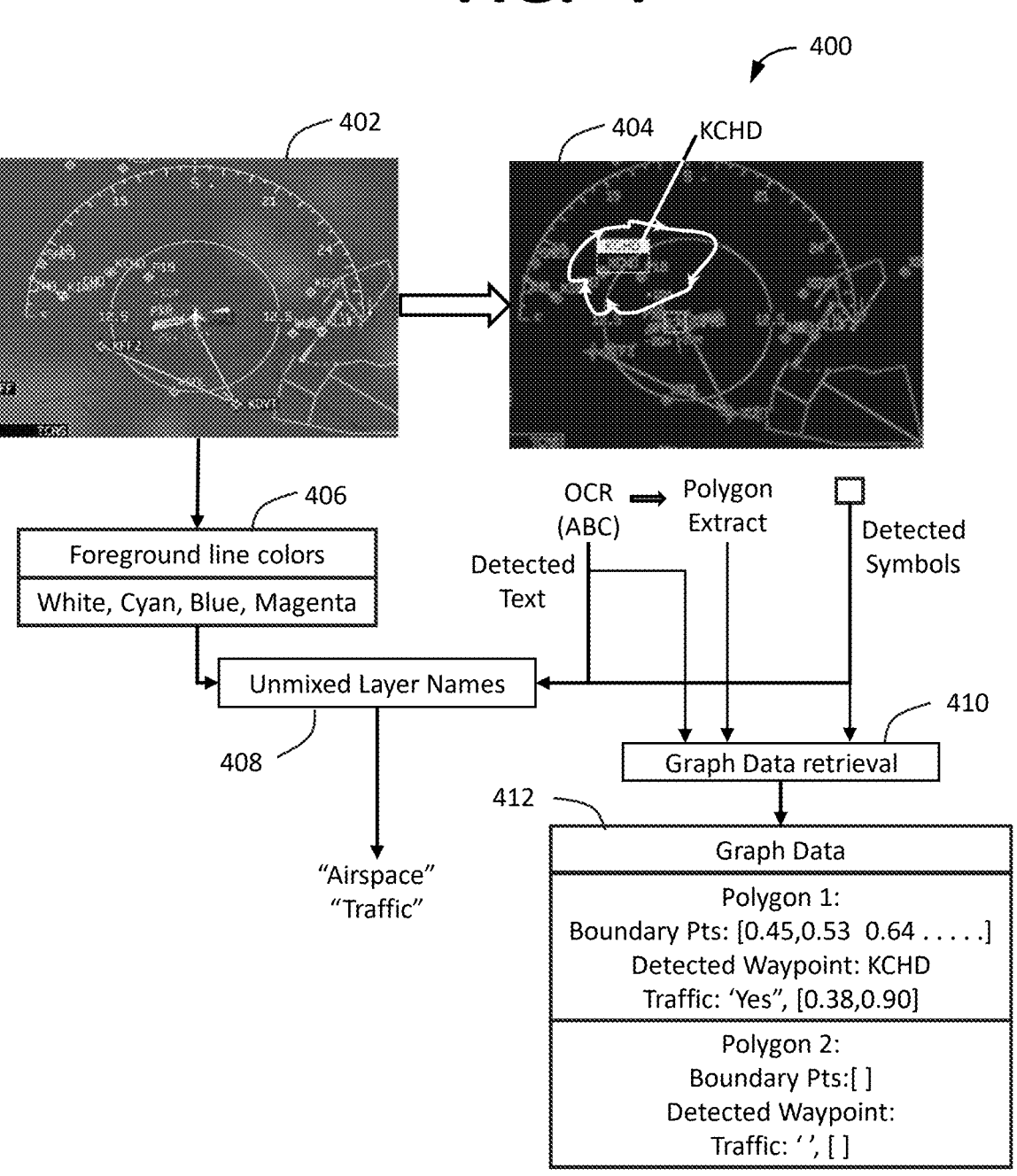
Figure 6:
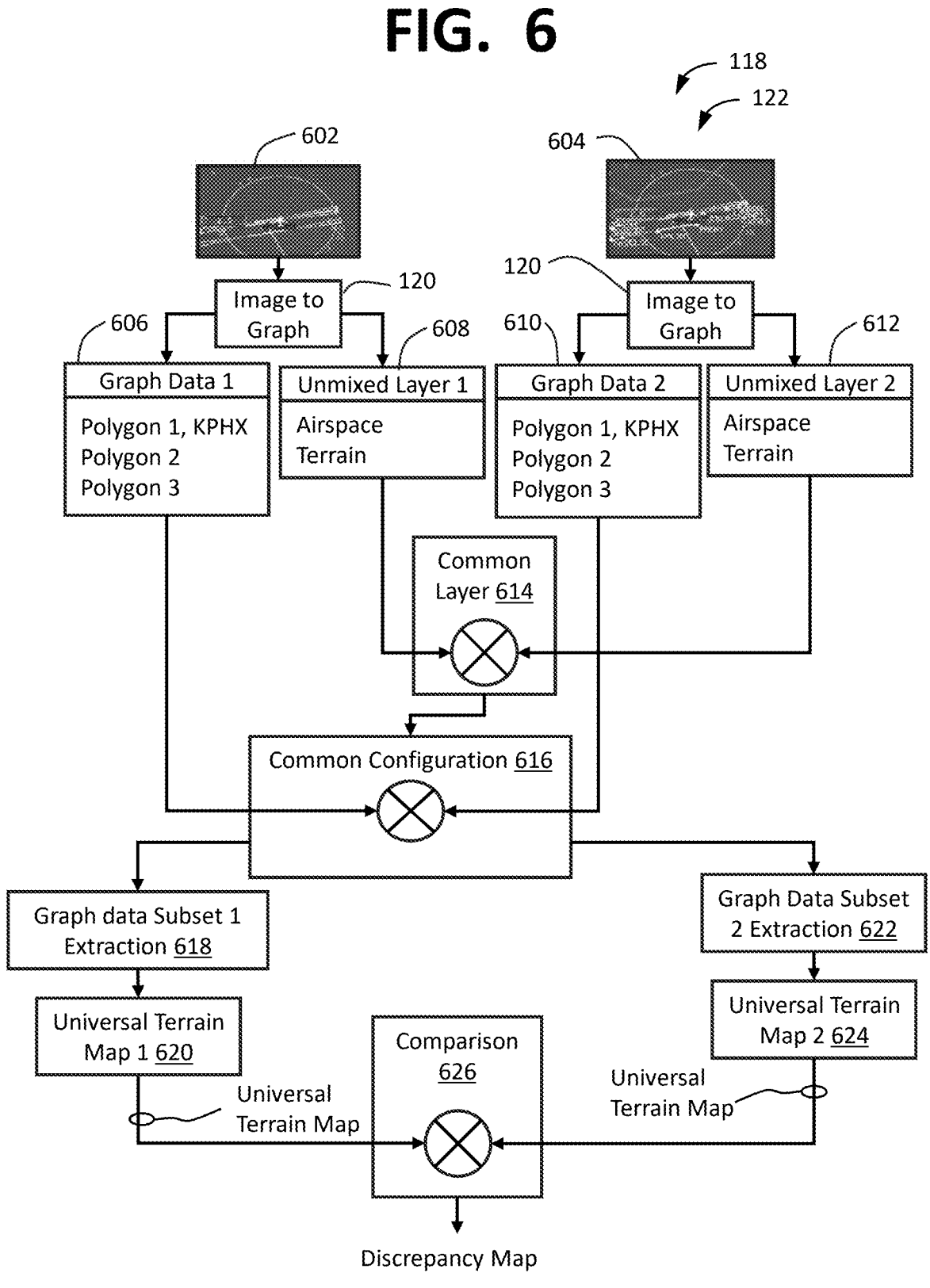

FIG. 4 is a schematic flow diagram to explain the method of FIG. 2 according to at least one of the implementations herein;

FIG. 5 is a flow chart of an example process of generating a discrepancy map comparing parts of different source maps that refer to the same information according to at least one of the implementations herein;

FIG. 6 is a schematic diagram of an example discrepancy map used to operate the method of FIG. 5 according to at least one of the implementations herein; and FIG. 7 is a flow chart of an example process of discrepancy map analysis according to at least one of the implementations herein.

DETAILED DESCRIPTION

The following detailed description includes example implementations that are not intended to limit the subject matter of the application and uses thereof. Furthermore, there is no intention to be bound by any theory presented in the preceding background, brief summary, or the following detailed description.

Horizontal maps (including horizontal or lateral situation maps) to be combined to form integrated maps come from a wide variety of sources, typically from multiple different original equipment manufacturers (OEMs) for a single aircraft, such that the look and style of each OEM's horizontal displays can look very different. The aircraft has software to combine these maps, and may include physical or hard copy charts that have been scanned whether by the OEM or another entity providing the maps to the aircraft. Other charts may be provided digitally such as on a pilot's electronic flight bag (EFB) or may be part of the avionics systems onboard the aircraft.

Many difficulties exist to combine these maps into a single display due to differences among the source maps including differences in style and text (down to the font differences and line thicknesses), symbology, information provided, scale (or range), which layers or layer structures are provided, layer definitions, layer priorities (which layer is in front or active, etc.) and layer titles (or labels) where each layer of a source map provides a different type of geographical data, and so forth. Map integration applications do not always factor all of these differences correctly, thereby resulting in mismatches that display erroneous objects, whether the wrong object or wrong location, on the integrated map. Even though alternate methods exist for pilots to navigate when a mismatch is discovered by the pilot, such as paper charts, detecting and correcting for these mismatches increases pilot workload and can result in undesirable consequences if observed too late or not at all. These mismatches can occur for a single display, or when showing multiple displays, such as when pilot and co-pilot each have their own display both showing the same integrated map. In this case, the two displays may not be entirely the same due to an error in the source map integration when the two integration maps are generated separately.

The integration is usually performed by using motor matching or a manual visual scan. To manually compare two different sources during diagnostics, it is impossible to identify every single mismatch due to the number of objects present in the maps and/or charts. This can be very costly when the same mismatch is later found to be important and adversely effects large fleets of aircraft.

A number of the map sources and integration applications can be used to form an integrated map and have diagnostics to detect mismatches. They are often inadequate, however, because these known applications often rely too heavily upon the coordinates (longitudinal, latitude, altitude) of the ownship as an anchor location for matching other objects. The known integration applications also have difficulty determining a source of a mismatch or discrepancy when more than two source maps are being used to integrate into a single map.

To resolve these issues, the disclosed method and system provides an automated approach to compare different sources of horizontal or lateral maps and identify differences in aeronautical and/or geographical data relevant for aircraft navigation and operation. Data for a discrepancy map can be automatically generated for each comparison. When the disclosed method is used for diagnostics and validation to first test map integration software to place on an aircraft, the discrepancy maps can be used to determine the best map sources to use for the integration. This generally refers to the best source entity (such as an OEM), and the best source map when several different maps are provided by a single entity.

The disclosed system and method strip out the non-relevant data from the maps, such as the format, style, and so forth so that the relevant map data remains. The layer structure of both maps being compared to each other is then analyzed. Only common layers of the two maps that have the same geographical type or category are then compared to find discrepancies. The discrepancy map for each comparison is then compared to each other to determine which source map generates the best results (or the lowest number of significant mismatches or errors) when the disclosed method and system is being used for validation before being used on aircraft. When the system and method are being used on an aircraft and a significant discrepancy is found between source maps, the aircrew may be alerted to the discrepancy.

The comparisons include converting the relevant source map into universal symbology that are easily compared. The comparisons are also based on identifying visual objects identifying text, polygons, and symbols from a source map rather than using ownship or other anchor location coordinates where precise geographical locations can unnecessarily limit the accuracy of the source map comparisons. Thus, the comparisons herein are airspace-based rather than ownship coordinate based. Polygons are an airspace or distinguishable geographic region with a particular definition, purpose, or limitation relative to avionics, such as controlled restricted or prohibited air space, air traffic service (ATS), an airspace identified by, or directed by, an air traffic control (ATC), airport traffic zones, special use airspace (SUA), flight info region (FIR), weather-related zones, no fly zones, environmental protection zones, or any specific geographical area and boundary that has a particular purpose. By one example, a polygon may provide one or more waypoints of a specific type of flight plan or point on a flight plan, or may be a terminal (or airport) airspace, to name a couple of examples.

With this arrangement, accurate and robust source map comparison of a wide variety of sources, styles (or formats), and so forth, is performed despite map layer comparison complexities. The analysis is achieved despite small changes in coordinates from map to map and other differences. The disclosed method and system obtain the visual objects as well as individual map layer information, such as type of data on the layer (for example, airspace, terrain, intersection, etc.), and forms graph data (or referred to as graph metadata) that accompanies the various map images in the analysis herein.

The disclosed method and system provide a systematic approach for handling inconsistencies, missing features, and conflicting data in integrated maps originating from the multiple sources to evaluate the map comparison results and prioritize which sources to use to increase reliability of the map integration. This ensures access to a wide range of data inputs, improving the accuracy and comprehensiveness of map comparison. It also addresses variability in map data formats, projections, and coordinate systems that improves this method of seamlessly integrating and comparing map layers from different sources and with very complicated map images or displays.

Figure 1:
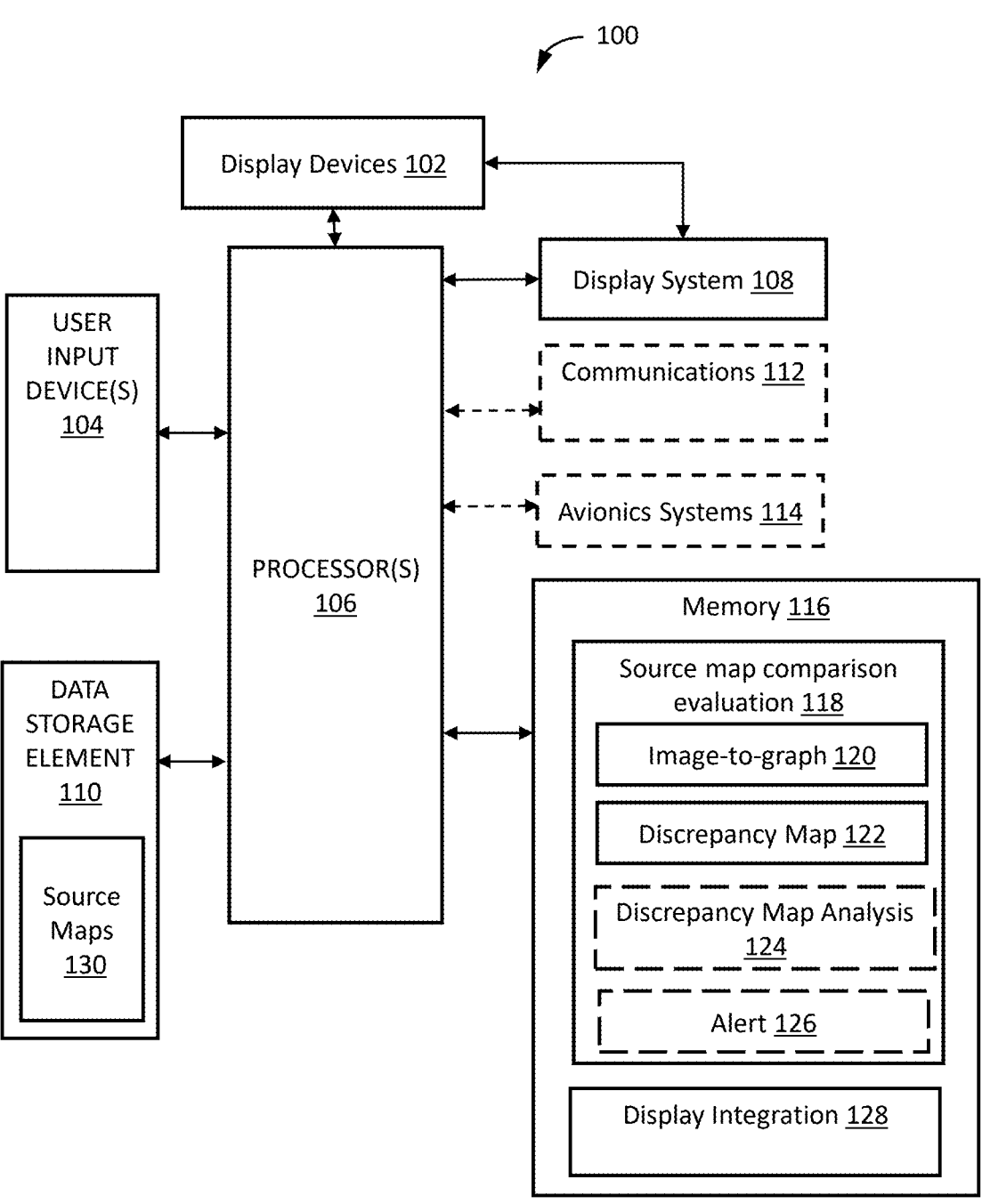
FIG. 1 is a schematic diagram of an example aircraft system with a display integration system according to at least one of the implementations herein.

Referring now to FIG. 1, an example system 100 may be located at a software testing facility remote from a vehicle that will subsequently use map integration on an aircraft depending on the test results. The present method and system 100 are diagnostic or evaluation based to determine the accuracy of the source map comparisons and select which combination of source maps can be reliably integrated. Thus, when the system 100 is located entirely at one or more testing facilities remote from the aircraft, the disclosed system may be operated to validate the software or system 100 and obtain certifications or approval from regulation agencies before using selected source maps on the aircraft.

Otherwise, the system 100 may be located entirely or partially on the aircraft to detect map discrepancies whether for the diagnostics or that should be communicated to the pilot for the safe and efficient navigation and control of the aircraft during use of the system 100. This may reveal that two displays both show integration maps each generated independently, such as a pilot and co-pilot displays, where the two integration maps are showing inconsistent images or information. Otherwise, a single display of an integrated map can have incorrect information compared to one of the source maps used to form the displayed integrated map.

Also, it will be understood that some units of the system 100 may be on the aircraft while other units may communicate remotely with those units of system 100 that are on the aircraft. Thus, in one example, the analysis may be performed remotely from the aircraft, while the source map data may be obtained from the aircraft, whether the source maps are compared for evaluation to select compatible source maps or to provide discrepancy warnings to the pilot. Any of the units and/or the entire system 100 also may be on a mobile device that can optionally be located on the aircraft and/or at a testing facility such as when the system 100 is operated on an electronic flight bag (EFB), laptop, tablet, smart device, and so forth for example. Many variations are contemplated.

In an example implementation, and regardless of the location of the whole system 100 or parts thereof, the system 100 includes, without limitation, a display device 102, one or more user input devices 104, processor circuitry forming one or more processors 106, a display system 108, a data storage element 110, and a memory 116. When the system 100 is onboard an aircraft, the system 100 also may have a communications system or unit 112, and one or more avionics systems 114. The memory 116 may store programs or applications such as a source map combination evaluation (SMCE) unit 118 and a display integration unit 128.

The SMCE unit 118 may have an image-to-graph unit 120 and a discrepancy map unit 122. When the SMCE unit 118 is provided at a testing or other facility to first determine compatible source maps, the SMCE unit 118 may have a discrepancy map analysis unit 124. On the other hand, when the SMCE unit 118 is provided on the aircraft to communicate discrepancy alerts to a pilot, the SMCE unit 118 may have an alert unit 126.

In example implementations, the display device 102 is an electronic display device capable of graphically displaying avionic displays including a horizontal display (or horizontal situation display or horizontal situation indicator (HSI)) or lateral source maps as well as integrated maps. The source maps and a corresponding integrated map may be displayed on different displays or one or more of the maps may share a display device screen. The display device 102 may display any other images including pages for flight planning, primary flight display (PFD), vertical situation display (VSD), or any other vehicle or aircraft display when on a vehicle. The display device 102 also may display any data analysis or discrepancy analysis data when the display device is at a testing facility or other such facility.

The user input device 104 may be any device used on the aircraft or other location with system 100, and may be a mouse, keypad or keyboard (whether physical or virtual), touchpad, touch panel (or touchscreen) on the display device 102, joystick, knob, line select key, audio input device, such as a microphone, audio transducer, audio sensor, or the like, and/or another suitable device adapted to receive input from a user.

In this example, the user input device 104 and the display device 102 are coupled to the processor 106. The display device 102 also is coupled to the display system 108. The processor 106 and the display system 108 are cooperatively configured to display, render, or otherwise convey one or more graphical representations or images associated with source maps and/or map integration, but also images related to operation of the aircraft when system 100 is provided on the aircraft. The user input device 104 may or may not be considered entirely or partially part of display device 102. The user input device 104 and the processor 106 are cooperatively configured to allow a user (a pilot or evaluation operator) to interact with the display device 102 and/or other elements of the system 100. By one form, the display device 102 is or has a graphical user interface, and may include or be communicatively coupled to, the user input device 104.

The processor 106 is at least one processor formed by processor circuitry and includes the hardware, software, and/or firmware components configured to operate any of the units described herein, to facilitate communications and/or interaction between the elements of the system 100, and to perform additional tasks and/or functions to support operation of the system 100, as described in greater detail below. Depending on the implementation, the processor 106 may be a general purpose processor such as a central processing unit (CPU), a content addressable memory, a digital signal processor, an application specific integrated circuit, a field programmable gate array, any suitable programmable logic device, discrete gate or transistor logic, processing core(s), discrete hardware components, or any combination thereof, designed to perform the functions described herein. The processor 106 may also be implemented as a combination of computing devices, e.g., a plurality of processing cores, a combination of a digital signal processors (DSPs), an image signal processor (ISP), and/or a microprocessor, a plurality of microprocessors, one or more microprocessors in conjunction with a digital signal processor core, a System on a Chip (SoC), or any other such configuration or combination. In practice, the processor 106 includes processing logic that may be configured to perform the functions, techniques, and processing tasks associated with the operation of the system 100, as described in greater detail below. Furthermore, the steps of a method or algorithm described in connection with the implementations disclosed herein may be embodied directly in hardware, in firmware, in a software module (or unit) executed by the processor 106, or in any practical combination thereof. For example, in one or more implementations, the processor 106 includes or otherwise accesses a data storage element (or memory), which may be realized as any sort of non-transitory short or long term storage media capable of storing programming instructions for execution by the processor 106. The code or other computer-executable programming instructions, when read and executed by the processor 106 (or computing device), cause the processor 106 to support or otherwise perform certain tasks, operations, functions, and/or processes described herein.

The display system 108 is the hardware, software, and/or firmware components configured to control the display device 102 and/or rendering of at least the source and/or integration maps described herein. In this regard, the display system 108 (and/or processor 106) may access or include one or more databases suitably configured to support operations of the display system 108 and for operating the SMCE unit 118.

Thus, in the illustrated implementation, the system 100 includes a data storage element 110, which may have databases to store source maps 130, style data to be extracted form source maps, layer data to be identified on source maps, polygon data to be identified on source maps, a common configuration database of corresponding visual objects from different source maps or input maps that indicate the same information (such as a square refers to a terminal on one source map while a circle refers to a terminal on another source map), universal map database and/or index of visual object correspondence to a universal visual object to replace those visual objects on both of two source maps being compared, combinations (or comparisons) tested, discrepancy data for each comparison, and other data used for the analysis herein. The data storage element 110 may store any other vehicle or avionics display data as desired. Depending on the implementation, the data storage element 124 may be physically realized using RAM memory, ROM memory, flash memory, cache, registers, a hard disk, or another suitable data storage medium known in the art, or any suitable combination thereof.

The source maps 130 also or alternatively may be received over a network, such as a computer network including the internet or other wide area network (WAN), local area network (LAN), or personal area network (PAN), a cellular network, a satellite network, and so forth.

The communications system 112 is configured to support communications to and/or from the aircraft. For example, the communications system 112 may support communications between the aircraft and air traffic control or another suitable command center or ground location, including a testing facility that runs the SMCE unit 118. Thus, the communications system 112 may be realized using satellite communication (SATCOM), broadband data link systems or other suitable data link system. Otherwise, depending on the implementation such as transmitting or receiving source maps or integration maps, the communications system(s) 112 also may include a controller-pilot data link communications (CPDLC) system, an aeronautical operational control (AOC) communications system, an aircraft communications addressing and reporting system (ACARS), and/or the like. The communications system 112 also may include radio such as a very high frequency (VHF) radio communications system.

The system 100, when on an aircraft, may include numerous avionics systems 114 for obtaining and/or providing real-time flight-related information that may be displayed on the display device 102 or otherwise provided to a user (e.g., a pilot). For example, practical implementations of the system 100 and/or aircraft will likely include one or more of the following avionics systems suitably configured to support operation of the aircraft: a weather system, an air traffic management system, a radar system, a traffic avoidance system, an autopilot system, an auto-thrust system, a flight control system, hydraulics systems, pneumatics systems, environmental systems, electrical systems, engine systems, trim systems, lighting systems, crew alerting systems, electronic checklist systems, an electronic flight bag (EFB) and/or another suitable avionics system.

The source map comparison evaluation (SMCE) unit 118 has an image-to-graph unit 120 that strips unnecessary data from the source maps and outputs graph data (or graph meta-data) of visual objects and layer definitions to be used for generating discrepancy maps, a discrepancy map unit 122 that generates discrepancy maps between common layers of different source maps, and a discrepancy map analysis unit 124 that determines which source maps are better for source map integration before run-time use on a vehicle or aircraft, or may be used to provide alerts to a pilot when map integration creates an error.

In detail the source map comparison evaluation (SMCE) unit 118 has the image-to-graph unit 120 to analyze each source map that is to be compared to other source maps. The image-to-graph unit 120 extracts non-relevant data such as styles, formatting, and so forth described in detail below. The image-to-graph unit 120 also identifies visual objects such as symbols and/or polygons (and text in this example) that indicate lateral navigation information or other information related to vehicle navigation or control of the vehicle. The image-to-graph unit 120 also identifies active layers on the source map being analyzed. The visual object data and the layer data of multiple source maps are then provided to the discrepancy map unit 122 to compare source maps and generate data of a discrepancy map. This may be performed by comparing layers of different source maps with the same type of class of geographical data, and converting the visual objects of the layers to be compared into universal visual objects. The discrepancy map unit 122 then compares the common layers of the source maps to each other to generate the discrepancy map of all or multiple discrepancies.

When the SMCE unit 118 is operated for validation and verification, the discrepancy map analysis unit 124 analyzes multiple comparisons among source maps to determine which source maps should be integrated together to provide the most accurate integrated map. The discrepancy map analysis unit 124 also may have an algorithm for finding a best source map to use for map integration when more than two source maps are being analyzed. This may result in a selection of source maps from a certain provider (or entity or company) for example, or selection of a source map when a single provider provides multiple different source maps, or a combination of both.

When the SMCE unit 118 is operated on the aircraft, an alert unit 126 may be provided that alerts the pilot when the discrepancy map unit 122 detects a sufficiently significant discrepancy between two source maps that will be used, or were used, that will result in an error on an integrated map.

The memory 116 also may store a display integration unit 128 that integrates source maps according to those source maps approved by the SMCE unit 118 that integrate adequately with a number of different types of source maps. Otherwise, the SMCE unit 118 may indicate when source maps integrate well with certain other source maps but not others. The details are provided below.

It should be understood that FIG. 1 is a simplified representation of the system 100 for purposes of explanation and ease of description, and FIG. 1 is not intended to limit the application or scope of the subject matter described herein in any way. Furthermore, practical implementations of the system 100 will include numerous other devices and components for providing additional functions and features.

Referring to FIG. 2, a process 200 for analyzing source maps to obtain data to be compared to that of other source maps is described according to at least one of the implementations herein. The process 200 includes operations 202 to 214, generally numbered evenly. Systems, device, modules, and units of any of FIGS. 1 and 3-7 may be referred to for process 200, where relevant. For example, the example image-to-graph unit 120 is shown in detail in FIG. 3 and provided to operate process 200.

Figure 3:
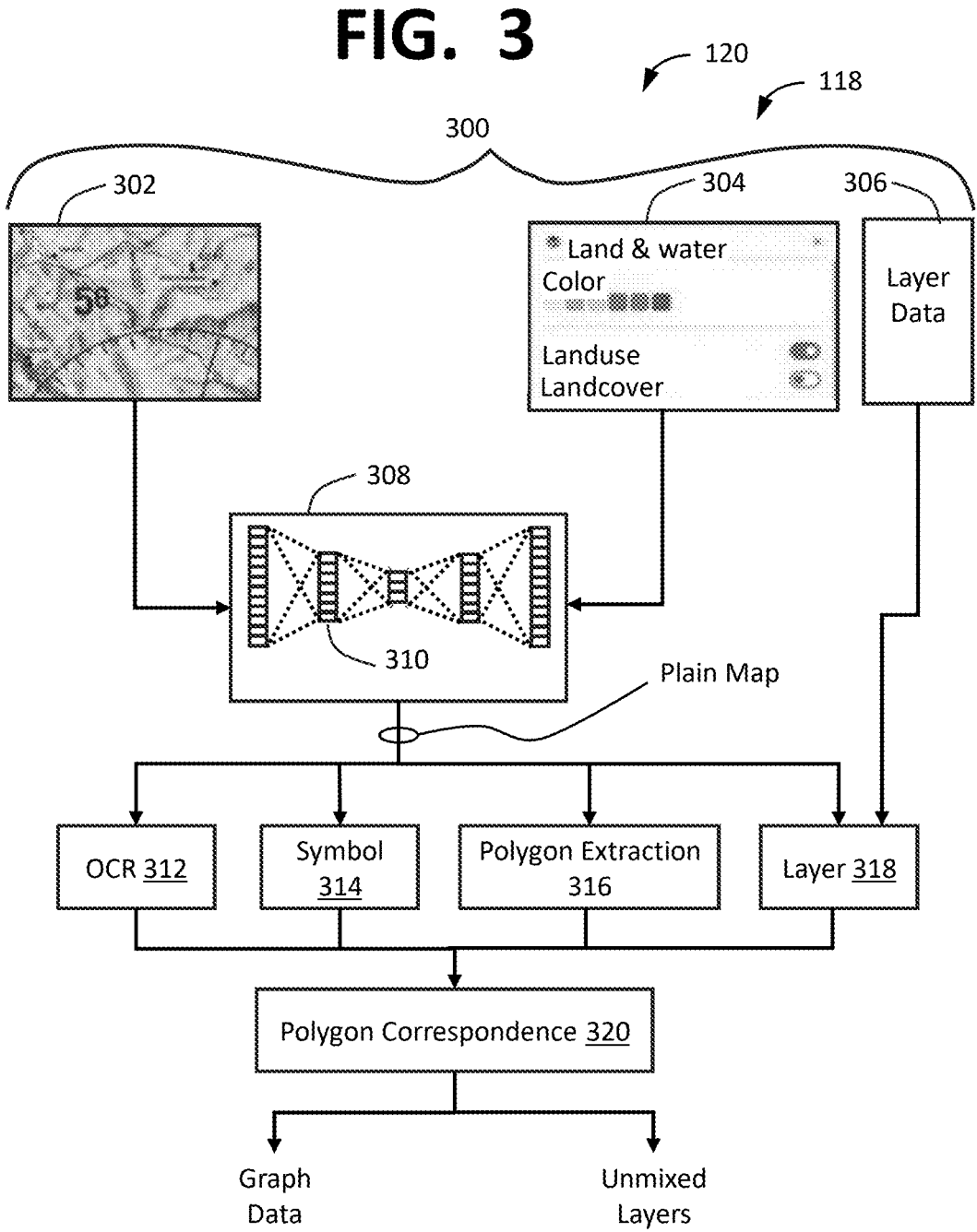
FIG. 3 is a schematic diagram of an example data extraction unit to operate the process of FIG. 2 according to at least one of the implementations herein.

Referring first to FIG. 3 for this example, the image-to-graph unit 120 receives a source map 300 in the form of a map image 302, style data 304, and layer data 306. The map image 302 and the style data 304 are provided to an irrelevant data extraction unit 308 (or plain map unit) that may have a neural network or other algorithms or models to extract style and irrelevant data described below. This is repeated for each source map being analyzed and across all layers of a source map (or the layer assignments of data on the source map 300 are ignored for this operation). Thereafter, an optical character recognition (OCR) unit 312, symbol detection unit 314, and polygon extraction unit 316 are used to identify or extract text, symbols, and polygons. A polygon extraction unit 316 is used to define the detected polygons. A layer unit 318 analyzes or obtains the layer definitions of the source map 300 from the layer data 306, and a polygon correspondence unit 320 determines the layer assignments of the identified visual objects including the polygons. The output is the visual objects in a graph data (or graph meta-data form) and layer labels or names 322 that are being used and the assignments of the visual objects to the layers. More detail is provided below.

Returning again to FIG. 2, process 200 includes "receive multiple source maps for map integration" 202. At least two source maps (or input maps) 130 (FIG. 1) in this example are received from a memory from a communication network and to be compared to each other to determine discrepancies to indicate whether either or both (or all) of the source maps can be used to generate accurate integrated maps on a vehicle, such as an aircraft cockpit. The source maps may be from different source map providers, such as different entities or companies that provided programs or applications for vehicle displays. Otherwise, the source maps may be different multiple maps from the same provider or some combination of both. The source maps may be different from each other in any one or combination of scale, rotation angle, symbology, aircraft position, and other differences as long as the source maps show the same or overlapping geographical area. The source maps may be retrieved from a memory or storage 110, or may be received in a transmission from the communications system 112 (when the system 100 is on an aircraft) or other communication network (including data networks).

The source maps are then analyzed one at a time to identify and retrieve relevant data for the discrepancy comparisons. As shown in the image-to-graph unit 120 (FIG. 3), a source map 300 may be received in the form of an image (or image data 302) with style data 304 as well as layer data 306. The image data 302 has the chroma and luminance pixel data for rendering the image, while the style data has accompanying style or format data used to present the image but may not be directly relevant to information the image conveys to a vehicle crew or aircrew desired for the aircrew to control the vehicle or aircraft in this example.

For example, style data 304 includes data for any one or combination of backgrounds, terrain representations, landmark features, land-use indicators, land-cover indicators, color schemes, image patterns, line or shape styles (solid, shading, dashed, line widths, transparency levels, etc.), landmark symbols and icons, legends, points of interest indicators, text font styles, font sizes, shading, gradients, theme-based features and styling (satellite map, weather map, street map, etc.), base map styles, and so forth. The land-use may include image or graphic indicators showing areas of mountain, rock, sand, forest, grasslands, wetlands, urban areas, snow, ice, and so forth, while land-cover indicators may include image or graphic indicators showing agriculture, residential, commercial, industrial, recreational, and/or transportation-related areas. Thus, style data refers to data that provides visual effects of a map or image that is not necessary to understand the information that is to be conveyed by a map or image, and could be conveyed with simple text and/or line work. For example, the style data may show mountains or water with shadow or shading to provide a multi-dimensional look when instead the mountains and water can be shown with simple lines when the style data is extracted (or removed). The style data may be in the form of meta-data accompanying a particular image that uses the style data, and may be found in the style-related data to present a style setup page 304, although many different forms or combination of forms of style data may be used instead.

Process 200 may include "generate a plain map" 204, and this may be performed by the plan map unit 308 separately for each source map (or input map) to be compared to other source maps, and this operation includes "extract style" 205. The generating of the plain maps may include inputting images 302 of each of the input (or source) maps 300 and corresponding style data 304 into a neural network 310 one source map at a time and repeated for multiple source maps 300. The output is a plain map for each source map 300 that is stripped of the style data 304. The plain maps each may still have visual objects including symbols, text, and polygons that indicate information desired to control a vehicle and may be unique (in shape, size, position, etc.) to a specific source map, type of source map, or source map from a certain provider.

The neural network 310 may be a generative neural network having an architecture of an auto encoder generative adversarial network, diffusion-based model transformer, or any other suitable architecture or combination of architectures including multiple neural networks. By one example, the neural network 310 may incorporate object recognition algorithms to recognize style data in contrast to visual objects to be maintained on the plain maps. This may include template matching, feature-based methods such as scale-invariant feature transform (SIFT), speeded up robust features (SURF), oriented FAST and rotated brief (ORB), edge detection, color-based methods, and/or other deep learning techniques. The architecture of the neural network (NN) 310 may include any of convolutional NNs (CNNs), recurrent CNNs (R-CNNs), you only look once (YOLO) architecture, single shot multibox detector (SSD), bag of visual words (BoVW), histogram of oriented gradients (HOG), deformable parts model (DPM), semantic segmentation, 3D modeling, and so forth to name a few examples. It will be understood that the neural network may operate with many different acceptable architectures as long as plain maps are generated as described.

By one example technique, it is presumed the neural network 310 first internally (or effectively) creates a pseudo style map from textual style data. This may be obtained from training the neural network on menus and screens of textual prompts or images of prompts that indicate style options and are used to form a source map from the style data. Next, it is presumed that the neural network subtracts the pseudo style map from the image 302 of the input map 300 to find the plain map image. The result is a plain map (also referred to as a plain terrain map image) that is devoid of any or most native style data previously in an original source map 300 (or the native style data) so that the plain map has a general or common (or default) style that is agnostic to any one particular source map provider, for example.

Process 200 may include "identify text, visual objects, and polygons from the plain map" 206 to identify (or extract) the visual objects on the plain maps, where each visual object has or indicates a geographical location and indicates information. The visual objects, as mentioned, have at least one of text, symbols, and polygons, wherein each polygon has a geographical location with a boundary (including coordinates and/or a defined area) and a classification or purpose associated with the vehicle.

Whether already performed by the neural network 310 of the plain map unit 308 or by an additional neural network or unit, this operation 206 may be performed by using optical character recognition (OCR) by the OCR unit 312 to recognize text of waypoints, locations, and so forth on the plain map. Symbology detection by the symbol unit 314 may be performed as mentioned for the plain map generation using object recognition techniques, while the polygon extraction unit 316 may be trained to recognize polygons and by training the neural network 310 (or other network) to recognize boundary definitions of the polygons on the image data of the source map. Also, the polygon extraction unit 316 may retrieve polygon meta-data defining the polygon and properties of the polygon that accompanies the source map when provided. The properties of the polygon may indicate the name (label) or purpose of the polygon, such as to show an area of vegetation, water, airspace restriction, etc. A version of the visual objects are stored and may be provided as meta-data associated with a source map, plain maps, and/or universal terrain map as described below.

Once the location and properties of the visual objects (text, symbols, and polygons) are identified, process 200 may include "determine correspondence of text and symbols to polygons" 208. Since the polygons are different geographical regions on the plain maps with location names, coordinates, and so forth, the polygon extraction unit 316 may link text and/or symbols to a polygon when it is found that a polygon location overlaps with the detected location of text and/or symbols on the plain maps. Thus, the linking or correspondence of text and/or symbols to a polygon depends on the position of the text and symbols relative to a boundary of the polygon. Also, the linking may be performed by using a neural network or other algorithm to determine whether symbols or text near, but not within, a boundary of a polygon are nonetheless still related to that polygon. Symbols or text linked to a polygon may or may not indicate the title of the polygon and the type of distinguishing geographical area (or purpose) of the polygon as mentioned above. At this point in the process 200, the polygon shape, boundary arrangement, symbols, and text linked (or corresponding) to a polygon on a plain map, as well as other visual objects not linked to a polygon on the plain map, still may be unique to a specific source map provider or type of source map.

Process 200 also may include "associate visual objects with layers" 210, where the layer unit 318 and polygon correspondence unit 320 determine the correspondence between one of the layers of the plain map and the detected polygons, and in turn the text and symbols linked to the polygons. By one option, the correspondence between a layer and other visual objects not linked to a polygon may be determined as well. The layer unit 318 retrieves the layer data including layer properties such as definitions of geographical types of data on the layer and layer names (or titles) from the layer data 306 of the source map 300. The layer unit 318 also may obtain layer properties from other sources such as the plain map unit 308 when the plain map unit 308 handles layer data.

The polygon correspondence unit 320 then handles the layer property data and determines which polygons, and optionally which other visual objects, are on a particular layer, and this may be repeated for each layer found to form a source map. This is repeated for each source map. By one example, the input maps are avionic maps, and wherein the layer types or names (or titles) include terminal, flight plan, flight plan transitions, traffic, weather, terrain, airspace, NAVAIDS (navigational aids), fixes, waypoints, terminal procedures, and any others.

Process 200 may include "extract layer identification from source map data" 212, where here the layer unit 318 or the polygon correspondence unit 320 also may determine the layer structure and determines which polygons and other visual objects are on a single layer. The visual objects that are simultaneously on multiple layers are dropped. In other words, when the layers share a visual object the name of the layer for that visual object may indicate multiple layers such that tracking layer combination names may become impractical. Thus, the layers with visual objects that are not on any other layer are referred to as unmixed layers. By one example form, the analysis continues with visual objects only on unmixed layers. It should be noted, however, that a layer can be unmixed for some visual objects so that those visual objects still can be used, while the same layer may have visual objects shared with other layers and those visual objects with multiple layers cannot be used.

Process 200 may include "provide data of visual objects, correspondences, and layer identification" 214. This joint information is formed into data to provide to the discrepancy map unit 122 to determine discrepancies, and since this is based on visual objects of the source map, the visual objects, correspondences, and layer names (or IDs) may be referred to as graph data, and by some examples, graph meta-data when the data is accompanying images (or image data) of the plain maps in meta-data form. This includes providing the names or identification of the unmixed layers. The graph data has layer-wise information for multiple active layers, such as those mentioned above, and the text, symbols, and polygons (and/or other visual objects) that are individually contained on, or linked to, a layer.

Referring to FIG. 4, an example setup 400 is provided to show the graph data and summarize process 200. The setup 400 has style extraction applied to a source map 402 and that removes foreground line colors 406 such as white, cyan, blue, and magenta in this example. The result is a plain map 404 without unique style data (or agnostic to style information) of a source map data provider as described above. To determine visual objects, OCR may be used to detect text in the plain map 404 and then to perform polygon extraction and symbol detection. The thick white boundary line with arrowheads on plain map 404 defines the area of a polygon that is for a terminal and waypoint KCHD. It is then determined whether the visual objects such as detected text and detected symbols are assigned to (or linked to) an unmixed layer name 408, and that layer name is provided for those visual objects.

Also, the detected text, extracted polygons, and detected symbols are linked as described above and then provided or bundled into graph data (or graph meta-data) to be provided to the discrepancy map unit 122. In one example format, the graph data is arranged into numbered polygons each with boundary point coordinates, identification of the polygon, here being the waypoint KCHD, and identification of visual objects within the polygon, here being traffic. This also may be the name of the unmixed layer and shown here as an inquiry for relevant visual objects being linked to that layer. Then data then may include a confirmation (yes or no), and then lists the coordinates of that visual object which may be a symbol at coordinates listed of another aircraft near an ownship. This may be repeated for each or multiple polygons on a plain map as shown.

Referring now to FIG. 5, a process 500 for generating a discrepancy map for two source maps being compared to each other and potentially to be integrated together is described according to at least one of the implementations herein. The process 200 includes operations 502 to 520, generally numbered evenly. Systems, device, modules, and units of any of FIGS. 1-4 and 6-7 may be referred to for process 500, where relevant. For example, the example discrepancy unit 122 is shown in detail in FIG. 6 and provided to operate process 500.

Referring first to FIG. 6, the discrepancy unit 122 (also referred to as a graph-to-image unit or module) receives image data of two source maps 602 and 604 from the image-to-graph unit 120. Particularly, the visual object and layer data in the form of graph data (or graph meta-data) from the image-to-graph unit 120 is received from each source map 602 and 604 being compared. A common layer unit 614 compares layers 608 and 612 of source maps 602 and 604, respectively, to find common layers with the same geographical information. A common configuration unit 616 compares polygons (such as 'polygons 1, KPHX' originating from both source maps 602 and 604) to determine common or matching polygons that indicate the same or similar location and at least some of the same information, and on common layers of the different source maps 602 and 604. Those visual objects that meet this criteria (or match) are considered part of a common configuration and each of these visual objects are divided into a graph subset by a graph subset 1 or 2 extraction unit 618 or 622, one for each source map 602 and 604. Universal terrain map 1 and 2 units 620 and 624 then respectively convert the subsets into universal visual objects that are generic (rather than unique) to a particular source map type and source maps from a specific provider. This results in universal terrain maps that are then compared to each other by a comparison unit 626 to determine discrepancies and form a discrepancy map.

Returning to FIG. 5, process 500 may include "receive at least two source images", and as already described with operation 202 of process 200.

Process 500 may include "set reference source image" 504, and as described in detail below with process 700, one of the source maps (602 or 604 in this example) may be set as a reference map (or reference image) to be compared to data of all other source maps. The reference map designation is then switched to another source map when more than two source maps are being compared to each other. The reference map is switched until each source map being analyzed is compared to all of the other source maps. The discrepancy map for each comparison can then be used to determine a discrepancy amount or score in process 700 (FIG. 7) to determine which source maps provide good quality map integration and which do not.

Thus, process 500 may include "generate discrepancy map" 506, and this includes a number of operations described below. It should be noted that when the source (or input) maps are avionic maps, the determining of the discrepancy maps, and particularly the determining of common layers and data of discrepancy maps, is performed without using ownship aircraft longitudinal, latitude, and altitude positions in computations as an anchor (or projection or interpolation) position to determine position data of other visual objects that are not the ownship position for any of the processes 200, 500, and 700 described herein. However, an ownship position can still be its own visual object or polygon for the analysis herein.

Discrepancy map operation 506 may include "match map layers from the multiple map images" 508, and performed by the common layer unit 614. Particularly, this operation determines whether layers of the two source maps 602 and 604 are common layers used in both of the source maps. The additional layers (or uncommon layers) along with visual objects on those uncommon layers are discarded and are no longer part of the analysis. The determining of common layers includes matching layers that provide the same geographical data and have the same title or different titles predetermined to have the same type of geographical data. For the latter, a common layer database may be provided in or as storage 110 (FIG. 1) and may be a glossary of layer names to indicate when the layers are common layers despite having different names. In the example of FIG. 6, the common layers 608 and 612 are an airspace layer and a terrain layer. For this example then, a terrain layer may be the same as a 'ter' layer, and an airspace layer may be the same as an AS layer, and so forth. This can occur often when source maps are provided by different source map providers.

Once common layers are determined, a pair of common layers are analyzed a pair at a time for two source maps 602 and 604 being compared. When common layers are found, discrepancy map operation 506 may include "determine a common configuration by finding corresponding map data associated with the matched layers" 510, and performed by the common configuration unit 616. For this operation, map data matching is performed where a common configuration set of features can be generated by identifying corresponding visual objects (text, symbols, and polygons) that are visible on both of the common layers. The corresponding or matching visual objects are expected to indicate the same or overlapping geographical location with at least some of the same information.

The common configuration generation may include inputting the visual objects of two common layers being compared into a neural network or other algorithm. The neural network or other algorithm may use, or be trained on, a common configuration database holding a common configuration dataset stored in or as storage 110. The neural network recognizes when visual objects indicate the same or similar information and have the same or similar geographical location on the plain map, and in turn source map, sufficiently similar to be considered common data or common visual objects. Thus, for example, a visual object that is a waypoint in one common layer may have a star shape, while the same visual object waypoint in another common layer may be a diamond, and so forth. The coordinates may be different as well, and the common configuration neural network will be trained to recognize and analyze those differences to determine when the coordinates of visual objects indicate the same visual object anyway. This may include a consideration of distance between coordinates, shape, and/or size of the two visual objects and accompanying text, for example, but may use other considerations or factors. The architecture of such a neural network of common configuration unit 616 may be any suitable neural network structure, as mentioned above for neural network 310 (FIG. 3), to perform the tasks described herein. The output at this point is a common configuration that lists common visual objects and their correspondence from common layer to common layer. This is repeated for each pair of common layers of source maps 602 and 604 being compared.

The discrepancy map operation 506 may include "generate a first graph data subset by determining the graph meta-data associated with the first source image that is on the common configuration" 512 and "generate a second graph data subset by determining the graph meta-data associated with the second source image that is on the common configuration" 514. This refers to extracting the common visual object data form the common configuration itself when the common visual object data is collected to form the common configuration, or from the plain maps of the source maps 602 and 604 (or the source maps themselves) when the common configuration merely lists the common visual objects but does not collect the data for those common visual objects. The subset of each common visual object associated with one of the source maps 602 or 604 is designated as a graph data subset 1 extracted by an extraction unit 618, and the other as a graph data subset 2 extracted by a unit 622. It will be noted that while the subsets are in meta-data format, other formats may be used instead.

Process 500 may include "generate a universal terrain map image of each graph data subset" 516, where the common visual objects are converted into universal visual objects. The converting is performed by universal terrain map 1 and 2 units 620 and 624, and may include entering data of the visual objects into a neural network to generate the universal visual objects on universal terrain maps (or map images). This converts the different shapes, sizes and other properties of corresponding visual objects into the same shape and size of a corresponding generic or universal visual object shape and size (and other properties when relevant, such as color). This may be referred to as a type of map normalization. This generates two universal terrain maps with a standard (or generic) state or format for the universal visual objects so that that data of the universal visual objects can be directly compared.

The converting may be accomplished by training a universal terrain map (or just universal map) neural network that may be a generative neural network. By one form, the universal neural network receives one of the graph subsets as input one at a time, and can be text conditioned to accept text input of the visual objects in addition to images of the symbols and polygons. The training of the universal neural network may involve training with a universal dataset stored in a universal database as, or at, the storage 110 (FIG. 1) and may have predetermined conversions for converting the common visual object data (shape, size, text, or other properties) into universal visual objects. The data of the universal visual objects may be output and stored as universal graph data (or universal graph meta-data) accompanying universal terrain map images and data thereof. This is repeated for each pair of common layers of the source maps 603 and 604, and then repeated again for each comparison between the reference source map and another source map.

Once two universal terrain maps are generated for a pair of the common layers, the discrepancy map operation 506 may have the comparison unit 626 "compare the universal terrain map images to each other to determine discrepancies" 518. The comparing (or differencing) may include determining pixel-level differences between the two universal terrain maps. The pixel differences may be determined as differences in chroma value, color scheme value (such as an RGB value for example), luminance value, gray scale value, or other pixel value range. Other alternatives may be used such as gradients, or differences on a pixel block level, and so forth.

Then operation 518 may include "generate discrepancy map data as pixel differences of the terrain map images" 520. By this form, a discrepancy map is generated that has a pixel value difference at each or individual pixel locations of a universal terrain map. By one form, the source map, plain map, and universal terrain map all may have the same resolution. Since common visual objects (text, symbols, and polygons for example) are on the universal maps being compared, the discrepancy map indicates the size of location shifts of the universal visual objects from universal map to universal map. The discrepancy map then may be represented by a combined value, such as a sum of pixel differences on the discrepancy map. Other details are as follows.

Referring to FIG. 7, a discrepancy analysis process 700 for analyzing discrepancy maps is provided to either determine which potential source maps should or should not be used for map integration and/or to provided alerts to a vehicle crew, such as an aircrew regarding inaccurate integration maps. The process 700 is described according to at least one of the implementations herein. The process 700 includes operations 702 to 710, generally numbered evenly. Systems, device, modules, and units of any of FIGS. 1, 3-4, and 6 may be referred to for process 700, where relevant. For example, the process 700 receives the discrepancy maps from the discrepancy map unit 122 (FIG. 6) that operates process 500.

Process 700 may be performed by the discrepancy map analysis unit 124 (FIG. 1). Process 700 preliminarily mentions "repeat process 500 for each source map compared to the reference source map" 702, and this may include "use different source map until all source maps have been compared to each other" 704. Thus, as mentioned above with process 500, the result of process 500 is a discrepancy map for each comparison between each available pair of two source maps.

Process 700 may include "determine a faulty source image causing the largest discrepancy by finding a source map having a maximum error" 706. One way to accomplish this is to detect a source map with highest discrepancies as follows:

Inputs: at least two source maps,
Find n: the number of source maps,
Obtain map images from individual n sources,
Retrieve corresponding graph data (or graph meta-data) and layer information for each n source plain images.
Steps: For i=1: n
    Set Reference source: $Source_{Ref}=Source_i$
    Obtain $Discrepency\_MapRef_j=Discrepancy$
    $(Source_{Ref}, Source_j)$,
    where, j=1:n & j≠i,
    Find pixel difference: $ErrRef_j=\Sigma x \ \Sigma y \ Discrepency\_MapRef_j$ Compute mean error for all remaining j sources: $Err_i = Mean(ErrRef_j)$ Find Source n having maximum error from all the remaining sources:

Error Source ID=argmax($Err_1$, $Err_2$, . . . , $Err_n$)

With the algorithm provided above, the discrepancy map analysis unit 124 iteratively maintains one of the source maps as the reference map and generates a discrepancy map with each of the other source maps as described above. This is repeated for each source map as a reference map as needed until all possible pairs have a discrepancy map. A discrepancy map error, in this example, is a sum of the pixel discrepancy differences on a discrepancy map. Then, a mean error (or some other combination) is then generated for each reference or source map. The faultiest source map will have the highest mean error.

Process 700 may alternatively or additionally include "determine a source map with the smallest amount of discrepancies" 708, and this is performed in the same way as operation 706 except to determine the source map with the smallest error. Thus, the largest or smallest error alone may be determined or both may be determined. It also will be understood that the source maps may have an error ranking from best to worst when desired such as when other considerations are being factored for source map selection. Thereafter, the source maps from a certain source provider (or a certain source map from multiple source maps from a source map provider) may be used for map integration and with whichever other source map is being integrated with the source map with a lowest discrepancy error score. With regard to selecting a source map based on the provider of the source map, the analysis also may include data reliability scoring models that consider various factors such as data source reputation, update frequency, and historical accuracy to prioritize source map data providers.

Otherwise, process 700 may include "determine source map pairs with the smallest amount of discrepancies" 710. In this case, it is determined whether a source map provides adequately, or with good accuracy, with other specific types of source maps or source maps from a certain provider. In this case, the source map may be determined to have a lower or lowest discrepancy error with very specific source maps of a certain type from a certain source map provider, but may not perform well with other source maps so that the use of a source map may be limited to only those that integrate well together.

By another alternative, the processes 200, 500, and 700 are used on an aircraft, and the determination of discrepancy maps is used on source maps being used in real time. In this case, when two or more source maps are being used, the discrepancy errors of each source map is determined as in processes 200, 500, and 700. In this case, however, the error for each discrepancy map may be compared to a minimum threshold. When the error is greater than a threshold, this indicates a significant error, and an algorithm may be used to determine which visual objects are the largest contributor to the error. Then the pilot may be alerted to the error such as by flashing the visual object in red on the integrated display and/or an audio message as an alert or warning, for example, although many other alternatives can be used. A message may then be displayed on the display showing the integrated map to the pilot explaining the error. The message may state "terminal in wrong location on horizontal display" as one possible example.

It should be appreciated that the processes 200, 500, and 700 may include any number of additional or alternative operations, and the operations need not be performed in the illustrated order. Also, the operations of process 200, 500, and 700 may be performed concurrently, and/or may be incorporated into a more comprehensive procedure or process having additional functionality not described in detail herein. Moreover, one or more of the tasks shown and described in the context of FIGS. 2, 5, and 7 can be omitted from a practical implementation of the processes 200, 500, and 700 as long as the intended overall functionality remains intact.

For the sake of brevity, conventional techniques related to user interfaces, speech recognition, avionics systems, including determination of parameters associated with a transcribed message and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an implementation of the subject matter.

The subject matter may be described herein in terms of functional and/or logical block, module, or unit components, and with reference to symbolic representations of operations, processing tasks, and functions that may be performed by various computing components or devices. It should be appreciated that the various block components shown in the figures may be realized by any number of hardware components configured to perform the specified functions. For example, an implementation of a system or a component may employ various integrated circuit components, e.g., memory elements, digital signal processing elements, logic elements, look-up tables, or the like, which may perform a variety of functions under the control of one or more microprocessors or other control devices. Furthermore, implementations of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" refers to one element/node/feature is directly or indirectly joined to (or directly or indirectly communicates with) another element/node/feature, and not necessarily mechanically. Thus, although the drawings may depict one example arrangement of elements directly connected to one another, additional intervening elements, devices, features, or components may be present in an implementation of the depicted subject matter. In addition, certain terminology may also be used herein for the purpose of reference only, and thus are not intended to be limiting.

The foregoing detailed description is merely example in nature and is not intended to limit the subject matter of the application and uses thereof. Furthermore, there is no intention to be bound by any theory presented in the preceding background, brief summary, or the detailed description.

While at least one example implementation has been presented in the foregoing detailed description, it should be appreciated that a vast number of variations exist. It should also be appreciated that the example implementation or example implementations are only examples, and are not intended to limit the scope, applicability, or configuration of the subject matter in any way. Rather, the foregoing detailed description will provide those skilled in the art with a convenient road map for implementing an example implementation of the subject matter. It should be understood that various changes may be made in the function and arrangement of elements described in an example implementation without departing from the scope of the subject matter as set forth in the appended claims. Accordingly, details of the example implementations or other limitations described above should not be read into the claims absent a clear intention to the contrary.

What is claim is:

1. A method, comprising:
receiving map image data of multiple input maps of an overlapping geographical area and arranged to be displayed on a display device on a vehicle, wherein each input map has style data and at least one layer each associated with a different type of geographical data shown on the map;
generating, by at least one processor, multiple plain maps comprising removing the style data from the map image data of each input map;
determining, by at least one processor, common layers between at least two of the plain maps showing the same type of geographical data;
determining, by at least one processor, data of a discrepancy map of discrepancies between the common layers of at least two of the plain maps and for each common layer of the at least two plain maps; and
generating, by at least one processor, an error value of the at least two plain maps comprising using the discrepancy maps.

2. The method of claim 1, comprising determining an input map associated with a largest error or a smallest error or both of all input maps compared to each other to determine the discrepancies.

3. The method of claim 1, comprising identifying visual objects in the plain maps each having a geographical location and indicating information on the at least one layer, wherein the visual objects comprise at least one of: text, symbols, and polygons, wherein each polygon has a geographical location with a boundary and a classification or purpose associated with the vehicle.

4. The method of claim 3, comprising determining a common configuration wherein two common layers are compared to identify common visual objects expected to indicate the same or overlapping geographical location with at least some of the same information.

5. The method of claim 4, comprising converting the visual objects included in the common configuration and of the two common layers respectively into universal visual objects of two universal terrain maps, wherein a universal visual object of one common layer has the same shape and size of a corresponding universal visual object of the other common layer; and comparing the universal terrain maps of the two common layers to determine the discrepancies.

6. The method of claim 5, wherein the comparing comprises determining pixel differences between the two universal terrain maps.

7. The method of claim 5, wherein the converting comprises entering data of the visual objects into a neural network to generate the universal visual objects.

8. The method of claim 3, wherein a version of the visual objects are stored and provided as meta-data of associated input maps, plain maps, and universal terrain maps.

9. The method of claim 1, wherein the generating of the multiple plain maps comprises inputting images of the input maps and corresponding style data into a neural network that outputs the plain maps.

10. The method of claim 1, wherein the input maps are avionic maps, and wherein the layer types comprise one or more of: terminal, flight plan, flight plan transitions, traffic, weather, terrain, airspace, NAVAIDS (navigational aids), fixes, waypoints, terminal procedures, and geographical maps.

11. The method of claim 1, wherein the input maps are avionic maps, and wherein the determining of the common layers and data of discrepancy maps is performed without ownship aircraft longitudinal, latitude, and altitude position-containing computations.

12. A system, comprising:
a display arranged to show horizontal input maps;
memory to store data related to visual objects shown on the horizontal input maps to be displayed on the display;
processor circuitry forming at least one processor communicatively coupled to the memory, and wherein the at least one processor is arranged to operate by:
receiving map image data of multiple horizontal input maps of an overlapping geographical area and arranged to be displayed on a display device on a vehicle, wherein each map has style data and at least one layer associated with a type of geographical data shown on the map, wherein the type of geographical data provides one or more visual objects each having a geographical location and indicating information on the layer;
generating multiple plain maps comprising removing the style data from the map image data of each input map;
determining common layers between at least two of the plain maps showing the same type of geographical data;
determining discrepancies between compared visual objects originally from different plan maps of common layers, wherein the compared visual objects are provided from the plain maps to indicate the same or overlapping geographical location and at least some of the same information; and
generating data of a discrepancy map of the discrepancies.

13. The system of claim 12, wherein the style data includes data for at least one of: backgrounds, terrain representations, landmark features, land-use indicators, land-cover indicators, color schemes, image patterns, line styles, landmark symbols, legends, points of interest indicators, text font styles, font sizes, shading, gradients, and theme-based features.

14. The system of claim 12, wherein the at least one processor is arranged to operate by identifying the visual objects comprising using text recognition and object recognition applied to the plain maps.

15. The system of claim 12, wherein the determining of common layers comprises matching layers having the same title or different titles predetermined to have the same type of geographical data.

16. The system of claim 12, wherein the visual objects comprise polygons reconstructed by associating text or symbols or both to one of the polygons depending on a location of the text or symbols or both relative to a boundary of one of the polygons.

17. A non-transitory computer-readable medium having computer-executable instructions stored thereon that, when executed by a computing device, cause the computing device to operate by:

receiving map image data of multiple input maps of an overlapping geographical area and arranged to be displayed on a display device on a vehicle, wherein each input map has style data and at least one layer each associated with a different type of geographical data shown on the map;

generating, by at least one processor, multiple plain maps comprising removing the style data from the map image data of each input map;

determining, by at least one processor, common layers between at least two of the plain maps showing the same type of geographical data;

determining, by at least one processor, data of a discrepancy map of discrepancies between the common layers of the at least two plain maps and for each common layer of the at least two plain maps; and generating, by at least one processor, an error value of the at least two plain maps comprising using the discrepancy maps.

18. The medium of claim 17, wherein the instructions cause the computing device to operate by:

determining visual objects on common layers having the same geographical type of data and from two different plain maps, wherein the visual objects each have a geographical location and indicate information on one of the common layers;

determining a common configuration comprising determining visual objects of the common layers that are expected to indicate the same or overlapping geographical area and at least some of the same information, wherein the determining of the common configuration comprises using a first common configuration database of correspondence between input map visual objects of different input maps and having different visual features including different shapes or sizes; and before determining the discrepancy maps, converting the visual objects of the common configuration into universal visual objects by using a second universal database of correspondence between visual objects in the common configuration and universal visual objects so that corresponding visual objects from the common configuration have the same universal visual object.

19. The medium of claim 17, wherein the instructions cause the computing device to operate by: receiving more than two plain maps; generating more than two corresponding universal terrain maps; determining a discrepancy map for each available comparison between two universal terrain maps; and determining which input map is associated with the universal terrain map with the least amount of discrepancies.

20. The medium of claim 17, wherein the two input maps being compared are different in any one or combination of: scale, rotation angle, symbology, and aircraft position.

* * * * *